United States Patent [19]

Rogler et al.

[11] Patent Number: 4,929,051
[45] Date of Patent: May 29, 1990

[54] OPTICAL GLASS FIBER WITH A PRIMARY COATING OF ORGANO-POLYSILOXANES CONTAINING ACRYLIC ACID ESTER GROUPS

[75] Inventors: Wolfgang Rogler, Erlangen; Christian Weitemeyer, Essen; Dietmar Wewers, Bottrop; Frederic Zapf; Bernhard Stapp, both of Erlangen, all of Fed. Rep. of Germany

[73] Assignee: Siemens Aktiengesellschaft, Berlin & Munich, Fed. Rep. of Germany

[21] Appl. No.: 173,271

[22] Filed: Mar. 25, 1988

[30] Foreign Application Priority Data

Mar. 27, 1987 [DE] Fed. Rep. of Germany ....... 3710240

[51] Int. Cl.$^5$ ................................. G02B 6/10
[52] U.S. Cl. ................. 350/96.30; 428/391; 428/383
[58] Field of Search ............ 428/373, 375, 391, 392; 350/96.30, 96.34; 522/99; 525/925

[56] References Cited

U.S. PATENT DOCUMENTS

| | | | |
|---|---|---|---|
| 4,301,268 | 11/1981 | Kropac | 528/26 |
| 4,306,050 | 12/1981 | Koerner et al. | 528/26 |
| 4,496,210 | 1/1985 | Ansel et al. | 350/96.3 |
| 4,606,933 | 8/1986 | Griswold et al. | 427/54.1 |
| 4,678,846 | 7/1987 | Weitemeyer et al. | 525/477 |
| 4,718,748 | 1/1988 | Broer, et al. | 350/96.30 |
| 4,733,942 | 3/1988 | Hida et al. | 350/96.34 |

FOREIGN PATENT DOCUMENTS

| | | |
|---|---|---|
| 0111280 | 6/1984 | European Pat. Off. . |
| 0155051 | 9/1985 | European Pat. Off. . |
| 0169592 | 1/1986 | European Pat. Off. . |
| 0223600 | 5/1987 | European Pat. Off. . |
| 3437531A1 | 4/1985 | Fed. Rep. of Germany . |
| 8400424 | 2/1984 | Int'l Pat. Institute . |
| 2041389A | 9/1980 | United Kingdom . |

Primary Examiner—George F. Lesmes
Assistant Examiner—J. M. Gray
Attorney, Agent, or Firm—Kenyon & Kenyon

[57] ABSTRACT

The present invention is directed to an optical glass fiber with a primary coating of organo-polysiloxanes containing acrylic acid ester groups which coating is inter alia hydrolysis stable and rapidly curable.

5 Claims, No Drawings

OPTICAL GLASS FIBER WITH A PRIMARY COATING OF ORGANO-POLYSILOXANES CONTAINING ACRYLIC ACID ESTER GROUPS

BACKGROUND OF THE INVENTION

The invention relates to an optical glass fiber with a primary coating, which, at least partially, consists of organo-polysiloxanes containing acrylic acid ester groups and having alkyl and/or aryl groups bound to silicon. The organopolysiloxanes are liquid at the application temperature and are polymerizable by high-energy radiation.

Optical glass fibers are clad with synthetic materials at the time of their production. These synthetic material coating means have the function of protecting the glass fibers - while maintaining their physical, in particular, optical properties - against mechanical and chemical influences of the environment. To fulfill these complex demands, the glass fibers are generally clad with two coatings of different kind and properties.

The first, i.e. the inner cladding layer (primary coating) in general is soft and rubbery elastic. It serves to maintain the mechanical strength inherent in the glass fibers and protects them against microbends and attenuation. The primary coating, therefore, should have a glass transition temperature of $< -40°$ C. and change its mechanical properties within the application temperature range of $-40°$ to $+80°$ C. as little as possible, so that within these temperature limits a constant attenuation response of the coated glass fibers is ensured. The modulus of elasticity of the coating should, if possible, be $\leq 10$ N/mm². In many cases it is also demanded that the refractive index of the coating substance is higher than that of the outer layer of the glass fiber. If it is taken into consideration that the refractive index $n_D{}^{25}$ of quartz glass lies between 1.45 and 1.46, then for the inner coating substance an index of refraction of $>1.46$ within the application temperature range is required.

The second, or outer, synthetic material cladding has essentially the function of protecting the glass fiber coated with the first synthetic material layer against mechanical and chemical influences of the environment, in particular, against the effect of moisture and against mechanical abrasion. This coating, therefore, is mechanically harder.

The coating substances are applied on the glass fibers during their production. Since the drawing process can take place at rates of greater than 5 m/s and curable synthetic materials or synthetic preparations are used as coating substances, curing of the synthetic materials or synthetic preparations must take place in less than 1 second, preferentially in less than 0.5 s.

Many types of a two-layer coating are already known. They are primarily UV-curable urethane acrylates, and are used in particular for forming the primary as well as also the secondary coating. Such coatings with urethane acrylates are described for example in DE-AS 34 37 531 and EP-OS 0 111 280. These materials, however, do not combine in themselves the required complex properties. By contrast, within recent years, organo-polysiloxanes modified with acrylic acid ester groups have proven useful. Given a suitable constitution, these polymers yield after UV radiation curing in the required time of less than 0.5 second, soft-elastic coatings of the desired kind.

A glass fiber with such primary cladding is described in EP-Al-0 155 051. The glass fiber here is provided with an enveloping layer with a refractive number, which is higher than that of the outer layer of the glass fiber. The enveloping coating is formed of a curable synthetic material composition, which contains a copolymer, which has as monomeric units dimethylsiloxane and at least one siloxane from the group methylphenylsiloxane and diphenylsiloxane. The copolymer itself is a compound having the following composition:

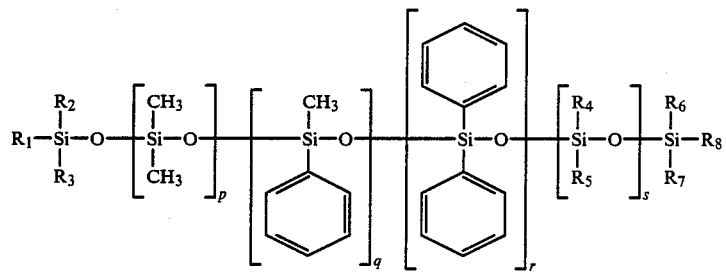

in which $R_1$ and $R_8$ are alkyl, aryl, and acrylate-containing alkyl groups, $R_2$, $R_3$, $R_4$, $R_6$, and $R_7$ are alkyl and aryl groups, and $R_5$ is an acrylate-containing organic group, the median molecular weight of the polymer molecules lies between 1000 and 1,000,000, and the median fractions of the monomeric units per polymer molecule lie within the following limits:

$0.005 \leq p \leq 0.995$ $0 \leq q < 0.995$ $0 \leq r \leq 0.49$ $0 \leq s \leq 0.1,$ where $0.005 \leq (q+2r) \leq 0.955$ and the monomeric units can be distributed blockwise, alternating or in any given way in the molecule, and where the copolymer contains at least two acrylate groups per molecule.

The acrylate-containing alkyl group is a group having the formula $-R_9OCOCH=CH_2$, in which $R_9$ is an alkylene residue, for example the group $-(CH_2)_n-$ with n being $\geq 1$. The coating materials, consequently, corresponding to this definition are made functional with monoacrylate groups, which are bound through a Si—C bond with the siloxane chain.

In the published international patent application WO 84/00424 silicon acrylates as primary coating materials are described, which have a molecular weight of 500 to 5000 and 2 to 6 monoacrylate groups. These monoacrylate groups are preferentially bound through Si—C bonds with the siloxane chain, since these lead to more hydrolysis-stable products than Si—O—C bonds. Potential hydrolytic degradation would lead through changing mechanical properties - to a change of the attenuation response.

The organo-polysiloxanes modified with acrylic acid ester groups are prepared in the manner that polysiloxanes with reactive side chains are converted with suitable functionalized monoacrylate compounds. Here, the preferred method of preparation is the conversion of hydroxyl, carboxyl, mercapto, or amino functional polysiloxanes with monoacrylate compounds, which contain an isocyanate group, for example with the adduct from 2-hydroxyethyl acrylate and isophorone diisocyanate. Such coating materials, however, cannot be adapted to the demand for increasingly higher curing rates without other desirable properties suffering in an unacceptable manner.

Therefore, an object of the invention is the development of optical glass fibers coated with a primary coating based on organopolysiloxanes containing acrylic acid ester groups and having alkyl and/or aryl groups bound to silicon. Another object is to develop this primary coating in such manner that it is stable to hydrolysis as well as rapidly curable without other required properties like low modulus of elasticity, low glass transition temperature and low viscosity being negatively influenced.

SUMMARY OF THE INVENTION

These and other objects are accomplished according to the invention by organo-polysiloxanes having the general

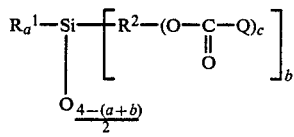

wherein:

$R^1$ is alkyl with 1 to 4 carbon atoms and/or phenyl and/or aralkyl of the following structure:

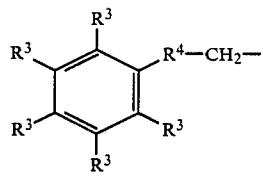

with $R^3$ being hydrogen and/or alkyl with 1 to 12 carbon atoms and/or halogen, and $R^4$ being alkylene with 1 to 8 carbon atoms (linear-chain or branched), $R^2$ is a linear-chain, branched, or cyclic alkylene residue with 1 to 20 carbon atoms, which can also contain oxyalkylene units, phenylene groups and acrylic acid or methacrylic acid residues, Q is one of the following esters which is bound to the carbon atom of a carbonyloxy moiety through the oxygen atom of a hydroxyl group of such ester, less the hydrogen atom thereof:

(i) (meth-)acrylate of diol with 1 to 10 carbon atoms as well as its oxyalkylene derivatives with 1 to 10 oxyalkylene units, or (ii) a multiple acrylate and/or methacrylate of a polyol from the group pentaerythritol, trimethylolethane, trimethylolpropane, and glycerin as well as their dimers and/or oxyalkylene derivatives with 1 to 10 oxyethylene and/or oxypropylene units, a = 1.6 to 2.2,
b = 0.001 to 1.6,
a ± b ≦ 3, and
c = 1 to 4.

DETAILED DESCRIPTION OF THE INVENTION

The organo-polysiloxanes serving in cured form as primary coating in the glass fibers according to the invention have preferentially a cumulation of (meth-)acrylic acid ester groups. Under these conditions, polyacrylate compounds-through a carbonate moiety - are bound to hydrocarbon residues of the organo-polysiloxanes. The hydrocarbon residues themselves are bound to the siloxane chain through Si-C bonding. The polyacrylate compounds are based on polyols (polyalcohols), the hydroxyl groups of which, insofar as they are not needed for bonding to the organopolysiloxane, are completely or partially esterified with acrylic and/or methacrylic acid.

Owing to the cumulated (meth-)acrylate groups the organo-polysiloxanes can be cured very rapidly. Curing, i.e. polymerization, takes place—after application of the silicon acrylates, which at the application temperature are liquid, onto the optical glass fibers—through high-energy radiation.

Index a has a value of 1.6 to 2.2, preferentially of 1.8 to 2.0. Index b has a value of 0.001 to 1.6, preferentially of 0.002 to 0.4. Index c has a value of 1 to 4, preferentially of 1 to 2.

The group $R^1$ is preferentially an alkyl group with 1 to 4 carbon atoms, in particular a methyl group, or an aralkyl group. The residue $R^1$ can assume different meanings within the molecule. In particular $R^1$ can denote a methyl and an aralkyl group, such as a beta-phenylpropyl group, in the same molecule. In a particularly preferred embodiment $R^1$ consists of a minimum of 20% of phenyl or aralkyl residues and a maximum of 80% of methyl residues, relative to the number of residues $R^1$.

Residue $R^2$ is dependent on the manner of manufacture of the organo-polysiloxanes and has preferentially one of the following structures:

—(CH$_2$)$_3$—, —(CH$_2$)$_4$—, —CH$_2$CH$_2$CH(CH$_3$)—,

—CH$_2$CH$_2$C(CH$_3$)$_2$—, —(CH$_2$)$_3$O(CH$_2$)$_3$—, —CH$_2$CH$_2$C$_6$H$_4$—,

—CH$_2$CH$_2$CH$_2$C$_6$H$_4$—;

—(CH$_2$)$_3$OCH$_2$CH(CH$_2$OCOCH=CH$_2$)—,

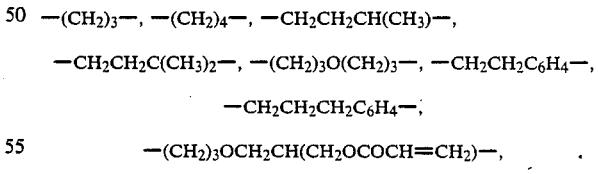

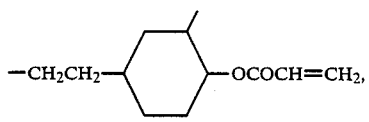

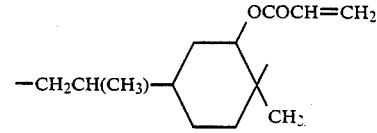

In a particularly preferred embodiment of the optical glass fiber according to the invention, the residue Q of the organo-polysiloxanes is the residue less the hydrogen atom of a hydroxyl group of a compound of the group pentaerythritol triacrylate, dipentaerythritol pentaacrylate, trimethylolethane diacrylate, ditrimethylolethane triacrylate, trimethylolpropane diacrylate, ditrimethylolpropane triacrylate, glycerin diacrylate diglycerin triacrylate or their oxyalkylene derivatives with 1 to 10 oxyethylene or oxypropylene units.

The (meth-)acrylic acid esters of the oxyalkylene ethers of the multivalent alcohols can be prepared in the manner, that per mol of multivalent alcohol 1 to 10 mol alkylene oxide are added and the thus obtained oxyalkylene ether of the multivalent alcohol is esterified with (meth-)acrylic acid while maintaining one hydroxyl function.

Particularly preferred are organo-polysiloxanes of the following general average formula:

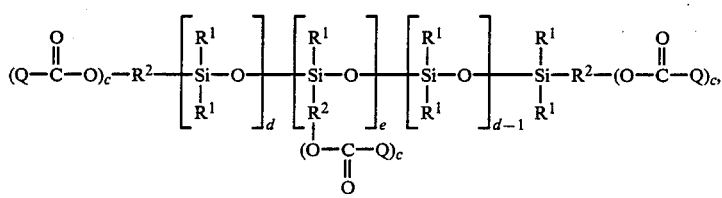

in which $R^1$, $R^2$, and Q are defined as above, and $c=1$ to 4, $d=1$ to 1000, and $e=0$ to 200.

In the preparation of the organo-polysiloxanes according to the invention the polyorgano-siloxanes that serve as starting compounds have the following structure:

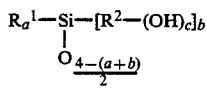

with $R^1$, $R^2$, a, b, and c defined as above.

These starting compounds can be prepared in simple and known manner through reaction of organo-siloxanes with a hydrogen bound to silicon with unsaturated compounds such as unsaturated epoxides and alcohols in the presence of a catalytic quantity of a platinum compound. If for the hydrosilylation reaction an epoxide is used, the oxirane ring subsequently is opened through the reaction with (meth-)acrylic acid to produce a secondary alcohol group.

Examples for the reaction of SiH-functionalized siloxanes with unsaturated alcohols, preferentially allyl alcohol, are listed in the following printed documents: EP-OS 0 159 729, DE-OS 3 222 839, and U.S. Pat. No. 2,970,150. In the printed documents EP-OS 0 169 592, DE-OS 3 316 166, DE-OS 3 044 317, and U.S. Pat. No. 4 293 678 the corresponding hydrosilylation reaction with unsaturated epoxides is found, which after opening the oxirane ring with (meth-) acrylic acid likewise yield hydroxyalkyl groups.

Preparation of the coating materials used for optical glass fibers according to the invention starts with polysiloxanes with hydroxyalkyl residues, which are prepared analogous to the manner described in the previously mentioned published documents. The unsaturated alcohols used here are preferentially allyl alcohol, 2-methyl-2-propene-1-ol, 3-methyl-3-butene-1-ol, 1-butene-3-ol, 1-butyne-3-ol, 2-methyl-3-butene-2-ol, 3-methyl-2-butene-1-ol, and longer-chain unsatrated alcohols. With the epoxides allyl glycidylether, vinyl cyclohexeneoxide, limoneneoxide, vinyl norborneneoxide, and dicyclopentadieneoxide are preferred.

Bonding of the hydroxyalkyl-functional polyorganosiloxanes with the (meth-)acrylic acid esters of the polyalcohols With a free hydroxyl group can take place in different ways. Preferred for this process are phosgene and lower alkylesters of carbonic acid. In a preferred manufacturing variant the hydroxyalkyl groupscontaining polyorgano-siloxanes are converted in the presence of aminic bases with chlorocarbonic acid esters corresponding to the following general formula to form a carbonate structure:

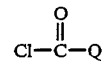

Residue Q here is a multiple acrylic or methacrylic acid ester less the hydrogen atom of a hydroxyl group of pentaerythritol, trimethylolethane, trimethylolpropane, glycerin as well as their dimers and/or of oxyalkylene derivatives with 1 to 10 oxyethylene and/or oxypropylene units.

Also carbonic acid esters of the general formula

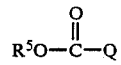

in which $R^5$ is an alkyl residue with 1 to 5 carbon atoms and Q is defined as previously, are suitable for conversion with hydroxyalkyl-functional polyorgano-siloxanes. In a further manufacturing variant, hydroxyalkyl-functional polyorganosiloxanes are converted with phosgene forming chlorocarbonate residues, which subsequently are allowed to react with the free OH group of a polyacrylate compound such as pentaerythritol triacrylate or glycerin diacrylate.

A further method of bonding polyacrylate compounds with a carbonate structure to polysiloxanes is the hydrosilylation reaction of SiH-functionalized polysiloxanes with allyl methylcarbonate and subsequent transesterification of the methyl group with the free OH group of the polyacrylate compound. Additionally, also unsaturated chlorocarbonic acid esters, which can be prepared from allyl alcohol or 2-allyl phenol in a reaction with phosgene, for example, enter into hydrosilylation reactions with SiH-functionalized polysiloxanes. The addition products resulting from this reaction can be converted in an analogous manner with the polyacrylate compounds with free hydroxyl groups.

Silicon acrylates with cumulated acrylate functionalization can, in principle, also be prepared by the path known from the state of the art by way of urethane structures. Such silicon acrylates also would show a fast curing rate, however, the mentioned disadvantages such as strong viscosity build-up and low hydrolysis stability of the urethane structures would also be encountered. Examples for organo-polysiloxane acrylates, which serve as primary coating in the glass fibers according to the invention, are as follows:

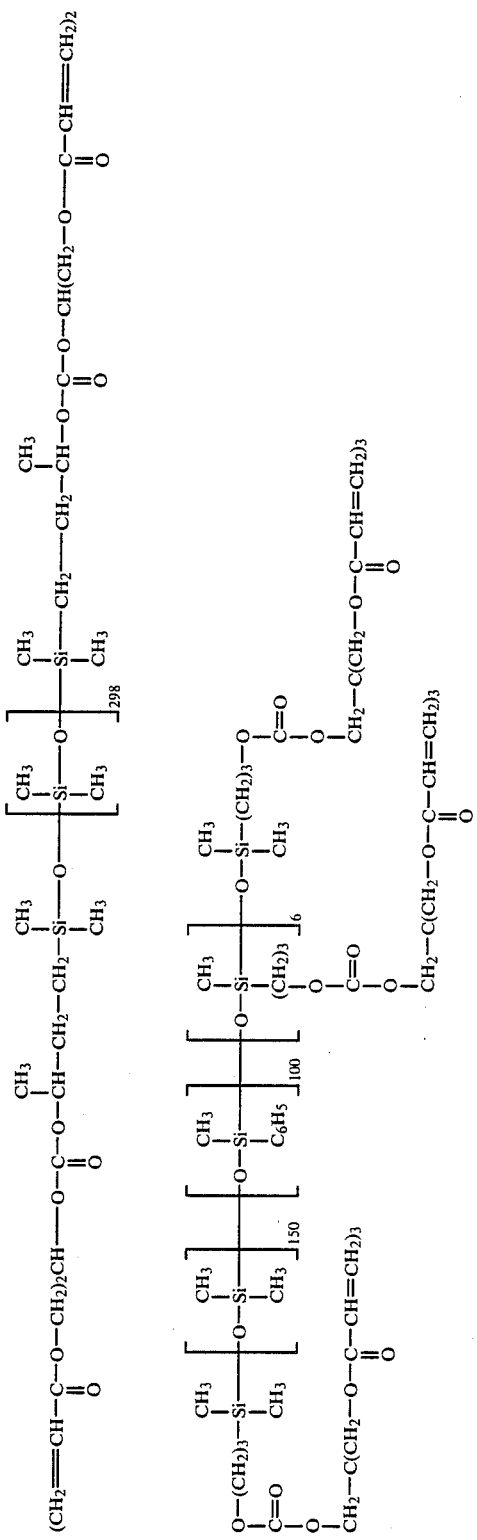
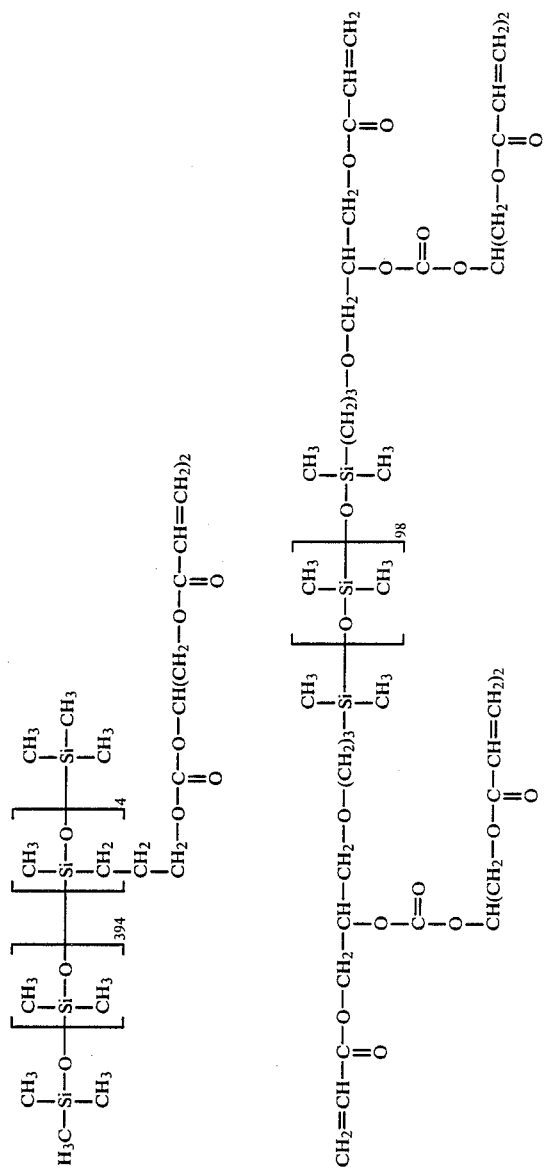

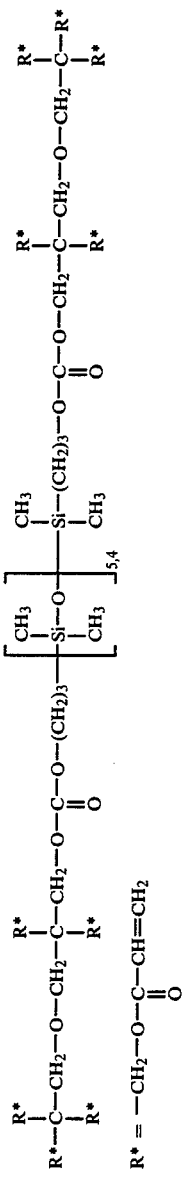
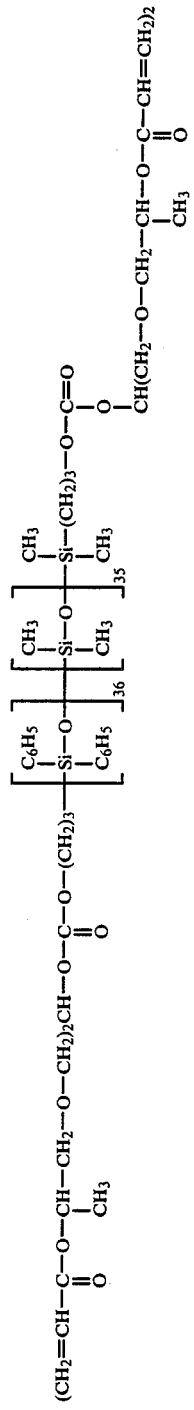

During the preparation of the organo-polysiloxane acrylates onto one of the hydroxyalkylene chains bound to the silicon atom can respectively be bound in a simple fashion two or more (meth-)acrylic acid ester groups. The silicon acrylates resulting therefrom have—in comparison to the state of the art—as coating materials for light waveguides (LWG), substantial advantages, which primarily can be traced back to the cumulation of (meth-)acrylic acid ester groups bound to one bonding site of the organo-siloxane chain. The cumulation of acrylic acid ester groups yields, in particular, an increase of the curing rate, without the increase in network density which results from a corresponding increase of the acrylate content through monoacrylate groups along the siloxan chain, as well as without an increase of the modulus of elasticity, and the glass transition temperature.

If the polysiloxanes, acrylate-functionalized through urethane bondings known from the state of the art, were to be adapted to ever-increasing curing rates, then additional acrylate groups would have to be introduced through functional side chains, which would manifest itself in ever more brittle properties of the cured product and, for another, due to additional acidic hydrogen atoms in an ever-increasing viscosity of the coating materials. In order to obtain workable systems, in such cases, therefore, reactive diluents would need to be added.

In the organo-polysiloxane acrylates according to the present invention which have a cumulation of acrylate groups with polar carboxylic acid ester groups, the cumulation of the acrylate groups yields greater compatibility with commercially available photoinitiators, which, based on experience, are not readily soluble in polysiloxanes. To it, however, a further increase of the curing rate is connected.

Further, in the silicon acrylates used according to the invention as LWG (light wave guide) coating, it is advantageous that bonding of the acrylate groups take place via a carbonate structure to hydrocarbon residues of the polysiloxane. The structural element built up in this way distinguishes itself, for example, when compared to a urethane structure by the absence of acidic hydrogen atoms. However, even given great chain lengths, this also leads to a low degree of viscosity necessary for the application in the range of 2000 to 6000 mPa.s at 25° C., which is obtained without the addition of reactive diluents. For reasons of industrial hygiene, dispensing with reactive diluents is desirable and has the advantage that an increase of the glass transition temperature above −40° C. can be avoided. The steric accumulation of acrylate groups in the vicinity of the carbonate structure furthermore effects in the cured material by way of additional hydrolysis stability of this structural element - advantages in long-term behaviour.

The intended purpose for using the described synthetic material compositions as primary coating for optical glass fibers requires selecting a refractive index of the coating material, which is greater than that of the outer layer of the glass fiber. It is known that when using polyorganosiloxanes, this is achieved in that in the polymer a given fraction of methylphenyl and diphenylsiloxane units are contained. The manufacture of such phenyl group-containing polyorgano-siloxanes, which, for example, takes place through co-hydrolysis of corresponding organo-chlorosilanes, is described in EP-OS 0 169 592. Another method of synthesizing phenyl-substituted polyorgano-siloxanes starts with polydimethyl-siloxanes with a high fraction of SiH groups, which are converted with olefinic substituted aromatic compounds, for example α-methyl styrene (in this connection see the simultaneously filed U.S. patent application Ser. No. 173,273 entitled "Optical glass fiber with a primary coating of acrylic acid ester groups-containing organo-polysiloxanes").

In order to set an index of refraction which is >1.46, it is preferred that at least 20% of the residues $R^1$ in the average molecule are phenyl residues. For influencing the elastic and other properties of the organo-polysiloxanes modified with acrylate residues, it is possible to use mixtures of organo-polysiloxanes, which differ with respect to the mean number of Si atoms. Use of such mixtures of equilibrated organopolysiloxanes is described in DE-OS 34 26 087. For primary coating especially such mixtures of organo-polysiloxanes have proven useful, which consist of 2 to 30 percent by weight of equilibrated organo-polysiloxanes with an average of 2 to 50 Si atoms and 70 to 98 percent by weight of equilibrated organopolysiloxanes with a mean of 50 to 2000 Si atoms.

Curing the acrylate-functionalized organopolysiloxanes takes place with high-energy radiation. When using electron beams and laser beams, no photoinitiators are required for the process. If curing takes place through UV-radiation, for initiation photoinitiators of the type acetophenone, benzophenone, benzoin ether, and thioxanthone are required, possibly with the addition of amines like triethanolamine and triethylamine. The choice of photoinitiator is a function of the compatibility with the organo-polysiloxane used as well as of the light source used and the presence of oxygen.

Reactive diluents such as N-vinyl pyrrolidone, phenoxyethyl acrylate, hexanediol diacrylate, tripropyleneglycol diacrylate, trimethylolpropane triacrylate, pentaerythritol tetraacrylate, glycerinpropoxy triacrylate, or butanediol diacrylate, do have an effect on the curing rate. They are, however, given appropriate adjustment of the chain lengths of the silicon acrylates, not necessary for the LWG coating. The physical properties of the coating materials can be improved through the addition of acrylate groups-containing oligomers or polymers based on polyesters, polyethers, epoxides, or urethanes.

As secondary coating for the optical glass fibers according to the invention radiation-curable silicon acrylates can be used selected on the basis of their properties as well as also other already tried and tested materials such as urethane acrylates or epoxy acrylates. What is essential here is good wetting of the primary coating as well as good adhesion to it. The secondary coatings are customarily applied directly after curing the primary coating and cured. It is equally possibly to apply a thermo-plastic secondary coating through extrusion onto the cured primary coating.

The invention will be explained in greater detail in conjunction with embodiments.

EXAMPLE 1

Manufacture of Chlorocarbonic Acid Ester Of Pentaerythritol Triacrylate (2-Acryloxymethyl-2-Chlorocarbonyloxymethyl-1,3-di-Acryloxypropane)

Into a heated three-necked flask with reflux cooler, dry pipe, internal thermometer, and drip funnel 200 ml of water-free dichloromethane are placed, and 0.3 mol phosgene in 160 ml toluene are added while the reaction mixture is kept in an ice bath. Subsequently, 59.6 g (0.2 mol) pentaerythritol triacrylate and 30.6 ml (0.22 mol) triethylamine in 50 ml dichloromethane are added dropwise over the course of 1.5 hours, and subsequently the mixture is agitated for 1 hour at 3° to 5° C. Following concentrating the preparation in a water jet vacuum, the concentrate is picked up with petroleum ether/ethyl acetate, the precipitate is filtered and the solvent drawn off at a bath temperature of 40° C. in vacuo. The raw product (69.1 g) has a chlorine content of 0.27 mol/100 g (93% of theoretical yield) and is used without further purification for the conversion with the polysiloxanes (cf. examples 3 to 10).

IR spectrum (film): 1780 cm$^{-1}$ CO-chlorocarbonate 1730 cm$^{-1}$: CO-ester

EXAMPLE 2

Chlolocarbonic Manufacture Of Chlorocarbonic Acid Ester Of Glycerin Diacrylate (2-Chlorocarbonyloxy-1,3-Diacryloxypropane)

Corresponding to Example 1, 40 g (0.2 mol) of glycerin diacrylate are converted with phosgene and worked up. The raw product has a chlorine content of 0.33 mol/100 g (87% of the theoretical) and is used in this form.

IR spectrum (film): 1780 cm$^{-1}$: CO-chlorocarbonate 1730 cm$^{-1}$: CO-ester

EXAMPLE 3

Manufacture Of Silicon Acrylate 1

A mixture of polydimethylsiloxanes with end-position hydroxy-propyl groups, consisting of components having an average chain length of n=50 (20%), n=300 (30%), and n=100 (50%), in which n denotes the number of siloxane units, with an OH content of 0.016 mol/100 g is dissolved in toluene and pyridine is added in slight excess. Then an equivalent quantity of the chlorocarbonic acid ester of pentaerythritol triacrylate - prepared according to Example 1 - in toluene is added dropwise within a period of 2 hours at a flask temperature of 60° C.; subsequently the mixture is agitated for 4 hours at 70° to 80° C. After filtration of the precipitate the volatile fractions are removed first in a water jet vacuum and then in high vacuum (0.1 mbar) at a bath temperature of 80° C.

Viscosity (23° C.) 1400 mPa.s

IR spectrum (film): 1750 cm$^{-1}$: CO-carbonate; 1730 cm$^{-1}$: CO-ester

EXAMPLE 4

Manufacture Of Silicon Acrylate 2

The preparation takes place corresponding to Example 3 using a mixture of polydimethylsiloxanes consisting of components of mean chain length of n=100 (40%) and n=400 (50%) with side-position hydroxypropyl groups as well as a α,ω-hydroxypropyl-substituted polysiloxane with a mean chain length of 50 (10%).

The OH content of the mixture is 0.015 mol/100 g. Viscosity (22° C.) 10800 mPa.s IR spectrum (film): 1755 cm$^{-1}$: CO-carbonate; 1735 cm$^{-1}$: CO-ester

EXAMPLE 5

Manufacture of Silicon Acrylate 3

Polydimethylsiloxane with an average chain length of n=400, side-position hydroxypropyl groups and an OH content of 0.008 mol/100 g was converted according to Example 3 with the chlorocarbonic acid ester of glycerin diacrylate (see Example 2).

Viscosity (23° C.) 5800 mPa.s

IR spectrum (film): 1750cm$^{-1}$: CO-carbonate: 1735 cm$^{-1}$: CO-ester

EXAMPLE 6

Manufacture of Silicon Acrylate 4

A mixture of polydimethylsiloxanes, consisting of components of mean chain length n=50 (20%), n=100 (40%), and n=4000 (40%) with side and end-position hydroxybutyl groups, with an OH content of 0.042 mol/100 g was allowed to react with pyridine and the chlorocarbonic acid ester of glycerin diacrylate as described in Example 3.

Viscosity (24° C.): 1100 mPa.s

IR spectrum (film): 1750 cm$^{-1}$: CO-carbonate; 1735 cm$^{-1}$: CO-ester

EXAMPLE 7

Manufacture Of A Chlorocarbonyloxylated Polydimethylsiloxane

To a solution of 0.6 mol phosgene in 600 ml water-free dichloromethane/toluene (1:1) under exclusion of moisture and in an ice bath 500 g of a mixture of polydimethylsiloxanes, consisting of components having a mean chain length of n=50 (15%), n=100 (45%), and n=300 (40%) with end-position 3-hydroxybutyl residues, with an OH content of 0.017 mol/100 g in dichloromethane with the addition of 1.1 equivalent triethylamine, are added dropwise over 4 hours. The flask temperature is maintained at 5° C. Subsequently, agitation takes place for another hour. Following that the preparation is concentrated in a water jet vacuum, mixed with petroleum ether, the resulting precipitate is filtered and the solvent drawn off in the water jet vacuum at a bath temperature of 40° C. Determination of the hydrolyzable chlorine yielded a content of chlorocarbonate groups of 0.015 mol/100 g (88% of theoretical).

IR spectrum (film): 1780 cm$^{-1}$: CO-chlorocarbonate

EXAMPLE 8

Manufacture of Silicon Acrylate 5

The chlorocarbonyloxylated polydimethylsiloxane according to Example 7 (content of chlorocarbonate groups: 0.015 mol/100 g) is added dropwise within 2 hours to equivalent quantities of glycerin diacrylate and pyridine in toluene at a flask temperature of 60° C. and then for another 4 hours the mixture is agitated at 70° to 80° C. Subsequently, it is concentrated in a water jet vacuum, taken up with petroleum ether and the precipitate is filtered off; the volatile components are initially removed in a water jet vacuum and subsequently in high-vacuum (0.1 mbar) at a bath temperature of 80° C.

Viscosity (25° C.) 3300 mpa.s

IR spectrum (film): 1750 cm$^{-1}$ CO-carbonate; 1735 cm$^{-1}$: CO-ester

EXAMPLE 9

Manufacture Of Silicon Acrylate 6

268 g of a mixture of polydimethylsiloxanes with 3-glycidyloxypropyl substituents in the $\alpha,\omega$-positions, consisting of components of a median chain length of n=50 (15%), n=100 (45%), and n=300 (40%), with an epoxide number of 0.019 mol/100 g are dissolved in 100 ml toluene, subsequentlY 3.8 g acrylic acid and 0.4 g N,N-dimethylbenzylamine are added, and, following the addition, the mixture is converted up to an acid number of 0.0018 mol/100 g while being boiled. Through the addition of aqueous bicarbonate solution the residual acid is bound, sodium sulphate added to remove the water and pressure-filtered through a filter press. The solvent is drawn off in a water jet vacuum at 40° C. The secondary OH groups of the reaction product (OH value: 0.014 mol/100 g) are, as described in Example 3, converted with the chlorocarbonic acid ester of glycerin diacrylate (cf. Example 2) and subsequently worked up.

Viscosity (27° C.) 5000 mPa.s
Index of refraction (20° C.) $n_D$=1.412
IR spectrum (film) 1750 cm$^{-1}$: CO-carbonate; 1735 cm$^{-1}$: CO-ester

EXAMPLE 10

Manufacture of Silicon Acrylate 7

A polyorganosiloxane with an average chain length of n=260, constructed of methylphenylsiloxane and dimethylsiloxane units in the ratio of 1:1.5 as well as of hydroxypropyl residues in side and end positions, having an OH value of 0.019 mol/100 g, is - corresponding to Example 3 - converted with the chlorocarbonic acid ester of pentaerythritol triacrylate and subsequently worked up.

Viscosity (22° C.): 1100 mPa.s
Index of refraction (20° C.) $n_D$=1.485
IR spectrum (film): 1750 cm$^{-1}$ CO-carbonate 1735 cm$^{-1}$: CO-ester

EXAMPLE 11

Determination of the Modulus of Elasticity

For determining the modulus of elasticity the silicon acrylates prepared corresponding to Examples 3 to 10 are mixed with 4% of a commercially available photo-initiator mixture (Tego Photoinitiator A4 by Th. Goldschmidt AG), projected in a layer thickness of 200±5 μm onto silicon wafers and completely cured through UV radiation. The films were subsequently cut into strips 50 mm long and 5 mm wide and through tensile elongation measurements in an Instron apparatus the modulus of elasticity was determined at 2% elongation. The obtained values are summarized in the following table.

| Silicon Acrylate | Example | E-modulus [MPa] |
|---|---|---|
| 1 | (3) | 0.38 |
| 2 | (4) | 0.52 |
| 3 | (5) | 0.40 |
| 4 | (6) | 6.0 |
| 5 | (8) | 0.38 |
| 6 | (9) | 2.2 |
| 7 | (10) | 1.2 |

EXAMPLE 12

Testing Hydrolysis Stability

The silicon acrylates prepared corresponding to Examples 4, 6, 8, and 9 were mixed with 4 % of a commercially available photo-initiator mixture for testing the hydrolysis stability of the cured coatings, homogenized in vacuo at room temperature and subsequently projected in a layer thickness of 200±5 μm onto a silicon wafer (diameter: 10 cm). UV curing took place with a fusion irradiation installation with Hg bulbs and elliptic reflector in a nitrogen atmosphere.

The films pulled off the silicon carrier were stored in a climate cabinet (40° C., 92% relative ambient humidity) horizontally on teflon plates. At intervals of 3, 6, and 12 weeks samples were taken and stored for 24 hours at room temperature. Subsequently through tensil elongation measurements in an Instron apparatus (sample geometry: 50×5 mm) the modulus of elasticity was determined at 2% elongation. The values, which are summarized in the following table indicate that following climate storage of 12 weeks no change of the modulus of elasticity of the samples within the measuring accuracy of 5% occurs compared to the starting value.

| Coating | $E_0$ | E(3 weeks) [MPa] | E(6 weeks) | E(12 weeks) |
|---|---|---|---|---|
| 2 | 0.52 | — | 0.51 | 0.51 |
| 4 | 6.0 | 6.1 | 6.1 | 5.8 |
| 5 | 0.38 | 0.43 | 0.37 | 0.38 |
| 6 | 2.2 | 2.29 | 2.19 | 2.10 |

EXAMPLE 13

Coating A Glass Fiber and Testing the Coated Fiber

At a fiber drawing tower from a preform a monomode fiber was drawn With an outer diameter of 125±1 μm and with a cell provided with the UV curable silicon acrylate 1. The silicon acrylate could be applied drop-free in a layer thickness of 35±3 μm, corresponding to an outer diameter of the primary- coated fiber of 195±5 μm. For the mechanical protection of the fiber with a second cell a commercially available UV-curable urethane acrylate was applied as secondary coating in a layer thickness of 25 μm. The doubly coated fiber has an outer diameter of 250±5 μm. Between the coating cells as well as after the second coating cell the fiber passed through a total UV-path of 75 cm with spheroidal reflectors and a lamp output of 120 Watt/cm. During curing flushing with nitrogen took place. The drawing rate was 2 m/s. Attenuation measurements yielded the values customary for monomode fibers of less than 0.5 dB/km.

Samples of the coated fibers were subjected to storage in the climate 40° C./92% relative ambient humidity as well as at a temperature of 100° C. Evaluation criterion for the response of the coating during stress was the shrinkage determined from the change of the overall fiber diameter.

During climate storage after 8 weeks shrinkage of only 2% was observed, no change was noted following temperature storage.

EXAMPLE 14

Testing the Thermal-Mechanical Properties

The silicon acrylates 1 to 7 were mixed with 4% photoinitiator and cured at a layer thickness of 400 μm with UV light. Subsequently, measurements were made in the dynamic mechanical spectrometer Polymer DMTA. The samples were mounted in three-point holdings and stressed with a frequency of 1 Hz at a heating rate of 5 K./min.

Evaluation of the diagrams yielded for the cured siliconacrylates a glass transition range of $< -40°$ C.; the siliconacrylate 6 (see Example 9) for example, has a glass transition temperature of $-55°$ C. In the temperature range of $-40°$ to $+80°$ C. the modulus of storage $E'$ is constant.

What is claimed is:

1. An optical glass fiber with a primary coating of cured organopolysiloxane wherein the pre-cured organopolysiloxane contains acrylic acid ester groups, has alkyl or aryl groups or mixtures thereof bound to silicon, is liquid at the temperature of its application to the fiber, is polymerizable with high-energy radiation, and said organopolysiloxane has the formula

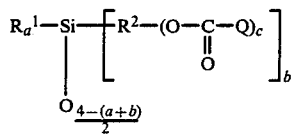

wherein:

$R^1$ is alkyl with 1 to 4 carbon atoms or phenyl or aralkyl of the following structure or mixtures thereof:

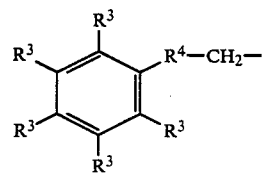

wherein
$R^3$ is at least one of hydrogen, alkyl with 1 to 12 carbon atoms and halogen, and $R^4$ being a linear-chain or branched alkylene with 1 to 8 carbon atoms, $R^2$ is a linear-chain, branched, or cyclic alkylene residue with 1 to 20 carbon atoms, which is unsubstituted or substituted by oxyalkylene units, phenylene groups, acrylic acid or methacrylic acid residues, and Q is one of the following esters which is bound to the carbon atom of a carbonyloxy group through the oxygen atom of a hydroxyl group of said ester, less the hydrogen atom thereof:

(i) a (meth-)acrylate of a diol with 1 to 10 carbon atoms or its oxyalkylene derivatives with 1 to 10 oxyalkylene units, or (ii) a multi-acrylate or methacrylate of a polyol selected from the group of pentaerythritol, trimethylolethane, trimethylolpropane, and glycerin or a dimer or oxyalkylene derivative thereof with a total of 1 to 10 units of at least one of oxyethylene and oxypropylene units;

a is 1.6 to 2.2; b is 0.001 to 1.6; a plus b is less than or equal to 3, and c is 1to 4.

2. An optical glass fiber according to claim 1, wherein the residue $R^1$ of the organo-polysiloxane contains a minimum of 20% of phenyl or aralkyl residues and a maximum of 80% of methyl residues, relative to the total number of residues $R^1$ in the organopolysiloxane.

3. An optical glass fiber according to claim 1 or 2, wherein the residue Q of the organo-polysiloxane is the residue, less the hydrogen atom of a hydroxyl group thereof, of a compound selected from the group of pentaerythritol triacrylate, dipentaerythritol pentaacrylate, trimethylolethane diacrylate, ditrimethylolethane triacrylate, trimethylolpropane diacrylate, ditrimethylolpropane triacrylate, glycerin diacrylate, diglycerin triacrylate, or of their oxyalkylene derivatives with 1 to 10 oxyethylene or oxypropylene units.

4. An optical glass fiber according to claim 1 or 2 wherein the organo-polysiloxanes are compounds corresponding to the general average formula

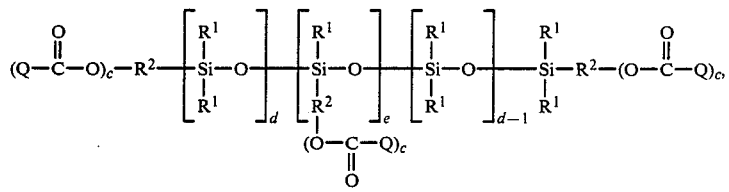

wherein $R^1$, $R^2$ and Q are as defined in claim 1 and c is 1 to 4, d is 1 to 1000 and e is 0 to 200.

5. An optical glass fiber according to claim 1, wherein the organo-polysiloxanes are mixtures comprising 2 to 30 percent by weight of equilibrated organo-polysiloxanes with a mean of 2 to 50 Si atoms, and 70 to 98 percent by weight of equilibrated organo-polysiloxanes with a mean of 50 to 2000 Si atoms.

* * * * *